April 5, 1960

M. J. PIFER ET AL 2,932,019

TELEVISION RECEIVER DIAL ILLUMINATION
BY SURROUND LIGHTING

Filed June 22, 1955

2 Sheets-Sheet 1

INVENTORS
MARION J. PIFER
AND JOHN HUDIG
BY Mason, Kolehmainen, Rathburn and Wyss.
ATTORNEYS.

April 5, 1960 M. J. PIFER ET AL 2,932,019

TELEVISION RECEIVER DIAL ILLUMINATION BY SURROUND LIGHTING

Filed June 22, 1955 2 Sheets-Sheet 2

INVENTORS
MARION J. PIFER
AND JOHN HUDIG
BY
Mason, Kolehmainen,
Rathburn and Wyss
ATTORNEYS.

2,932,019

TELEVISION RECEIVER DIAL ILLUMINATION BY SURROUND LIGHTING

Marion J. Pifer and John Hudig, Williamsville, N.Y., assignors, by mesne assignments, to Sylvania Electric Products Inc., Wilmington, Del., a corporation of Delaware Application June 22, 1955, Serial No. 517,278

2 Claims. (Cl. 340—369)

The present invention relates to television receivers, more particularly to the illumination of the station selector dial of a television receiver, and the invention has for its primary object the provision of a new and improved method of and apparatus for illuminating the dial of a television receiver wherein light normally provided for surround lighting of the television picture is also employed for dial illumination.

In prior art arrangements it has been proposed to provide surround lighting for the television picture wherein the area immediately adjacent the edge of the picture tube is illuminated by means of a suitable distributed light source so that eye discomfort of the observer over prolonged periods of observation is substantially reduced. Such an arrangement is shown in the copending application of Marion J. Pifer, Serial No. 291,123, field June 2, 1952 which copending application is assigned to the same assignee as the present invention. In prior art television receivers the station selector dial, which indicates the particular station to which the television receiver is tuned, is either not illuminated at all, in which case the dial is readable only for a short distance from the receiver due to the glare of the adjacent bright picture, or the dial is illuminated by a separate dial light assembly, as in radio receivers, which increases the cost of the receiver considerably. Furthermore, the conventional dial light assembly is complicated in construction and does not lend itself readily to television receiver applications wherein an easy to read tuning dial which complements but does not distract from the television picture is required.

It is, therefore, another object of the present invention to provide a new and improved dial mounting and illumination assembly for a television receiver.

It is a further object of the present invention to provide in a television receiver of the type having surround lighting adjacent the picture tube a dial assembly wherein the translucent mask of the surround lighting structure acts as a diffused light source to provide illumination for the dial.

The invention, both as to its organization and method of operation, together with further objects and advantages thereof, will best be understood by reference to the following specification taken in connection with the accompanying drawings, in which.

Figures 1, 2, 7:
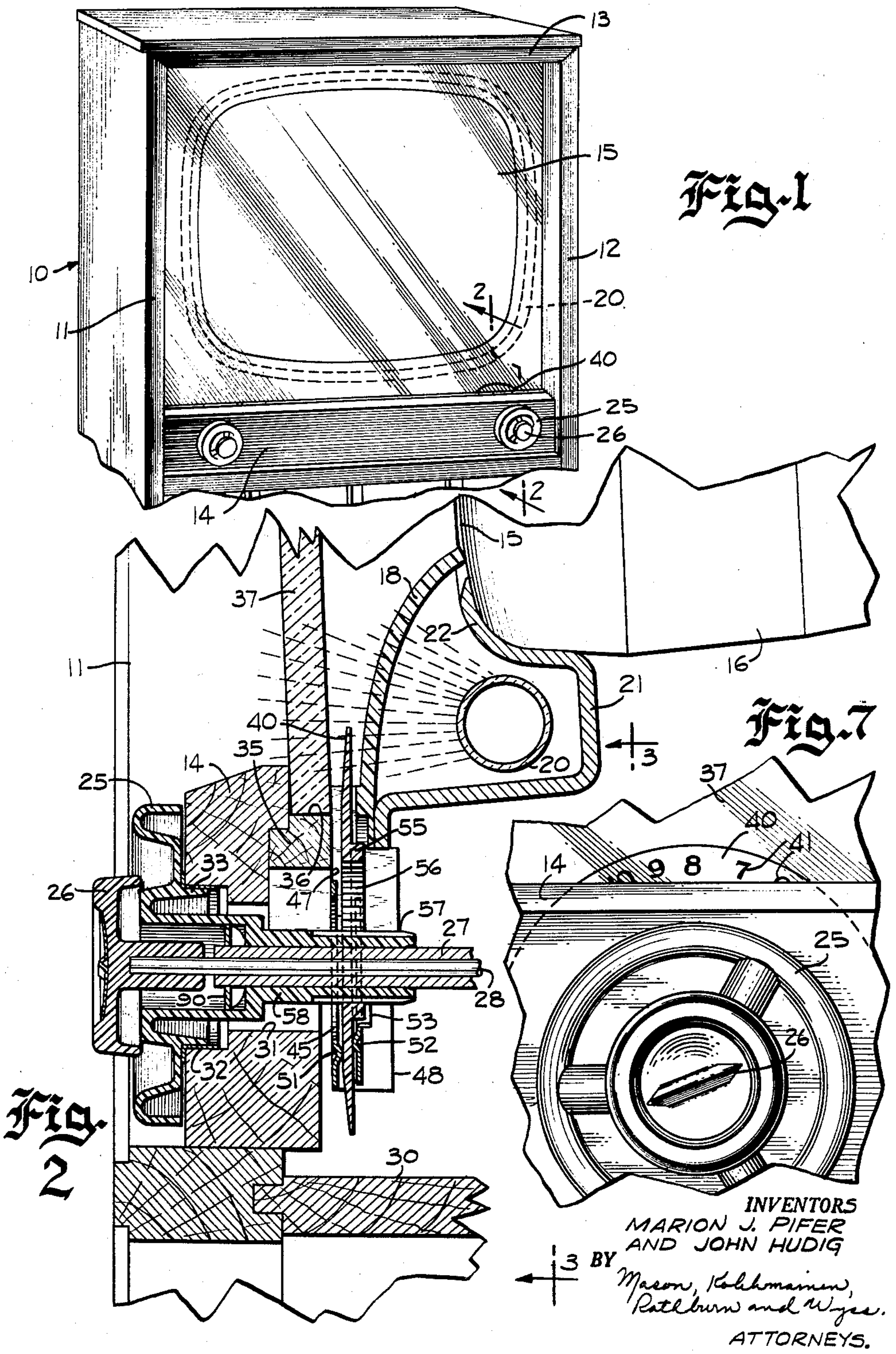
Fig. 1 is a fragmentary view, in perspective, of a television receiver embodying the principles of the present invention.
Fig. 2 is a fragmentary sectional view taken through the center line of the station selector knob of the television receiver of Fig. 1.
Fig. 7 is a fragmentary front elevational view of the station selector knob and indicator dial assembly of Fig. 1 on a somewhat larger scale.
Figures 3, 4, 5, 6:
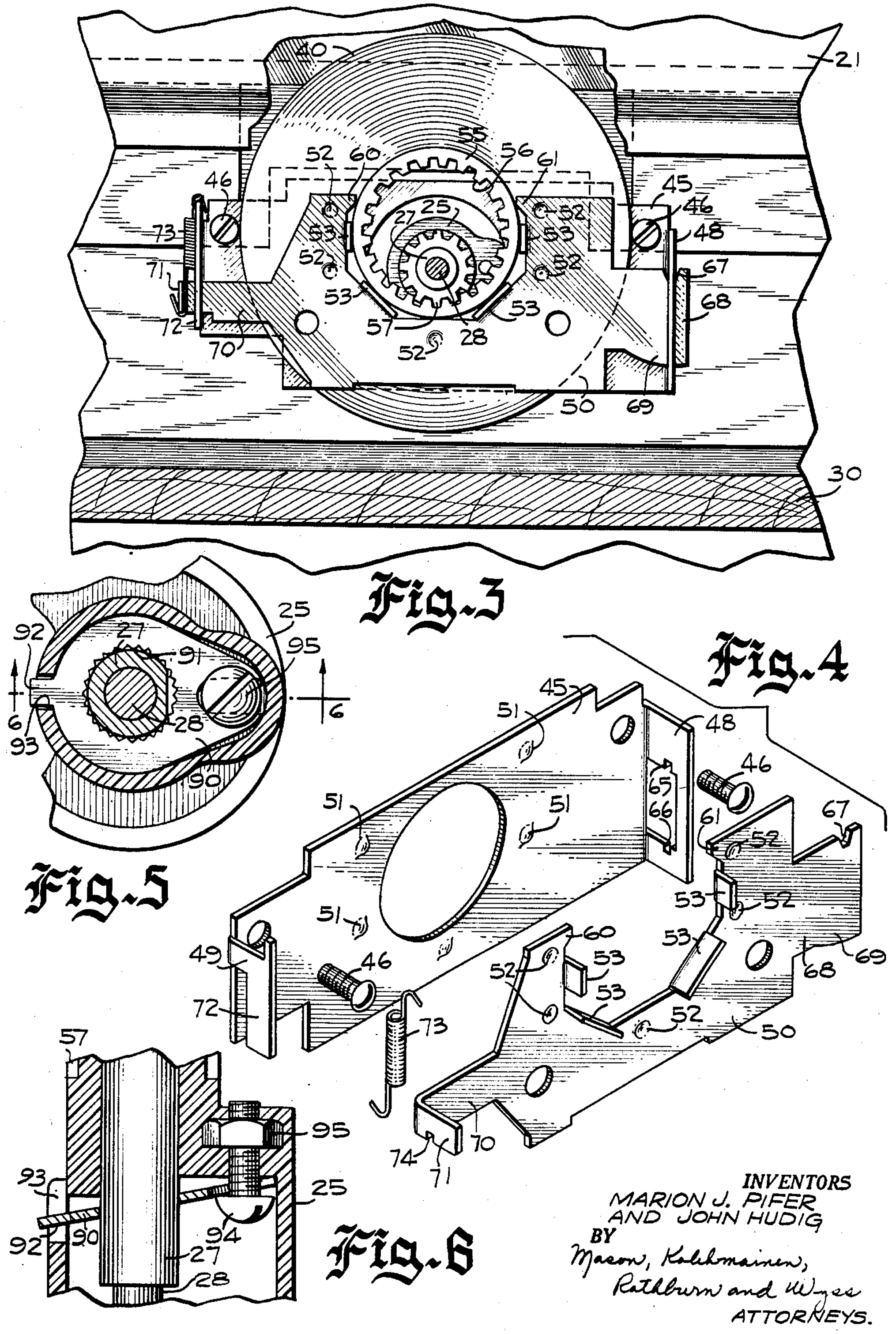
Fig. 3 is a sectional view taken along the lines 3—3 of Fig. 2.
Fig. 4 is an exploded perspective view of the mounting bracket arrangement shown in Fig. 3.
Fig. 5 is a fragmentary sectional view taken along the lines 5—5 of Fig. 2 and on a somewhat larger scale.
Fig. 6 is a sectional view taken along the lines 6—6 of Fig. 5.

Referring now to the drawings, the present invention is therein illustrated as comprising a television receiver which is housed in a cabinet indicated generally at 10 which is provided with the side members 11 and 12, a top member 13, and a knob rail 14 which extends transversely across the front of the cabinet, the members 11, 12, 13 and 14 defining a frame or opening positioned adjacent to and substantially surrounding the image screen 15 of the picture tube 16 of the television receiver housed within the cabinet 10. A translucent light diffusing mask 18 is positioned to provide a wide margin surrounding the image screen 15 which extends from the edges of the image screen 15 to the frame defined by the members 11, 12, 13 and 14. A distributed light source 20, which may comprise a conventional neon or fluorescent lamp filled with one or more inert gases and which may be energized in the manner shown and described in detail in the above identified copending application, is positioned behind the light diffusing mask 18 and within a trough-like light reflecting shield 21, the shield 21 being provided with the curved portion 22 which is adapted to provide a seat for the front end portion of the picture tube 16. The distributed light source thus provides uniform illumination of the mask 18 so as to produce surround lighting of the image screen 15, for the reasons described in detail in the above identified copending application of Marion J. Pifer.

On the right hand side of the knob rail 14 a pair of concentric knobs 25 and 26 are located, the outer knob 25 being connected to the station selector shaft 27 of the tuner portion (not shown) of the receiver so that the knob 25 functions as a station selector control to select a particular television station and the inner knob 26 being connected to the fine tuning shaft 28 of the tuner portion of the receiver, the shaft 28 being positioned within the station selector shaft 27 and controlling the fine tuning of the receiver, as will be readily understood by those skilled in the art. In this connection it will be understood that the concentric shafts 27 and 28 are supported on the chassis of the receiver which is mounted on the partition 30 of the cabinet 10 in such position that the knob 25 extends through the aperture 31 in the knob rail 14, a counterbore 32 of larger diameter than the aperture 31 being provided in the knob rail 14 to receive the flange portion 33 of the knob 25. An insert 35, which is secured to the knob rail 14, forms a groove 36 which is adapted to receive a transparent protective window 37 which may be of conventional safety glass construction and is positioned in front of the mask 18 and the image screen 15 of the picture tube 16.

In accordance with an important feature of the present invention, the station indicating dial 40 of the receiver, which is connected to the outer station selector knob 25 in a manner described in more detail hereinafter, is positioned with the upper portion thereof extending above the upper edge of the knob rail 14 and between the protective window 37 and the translucent mask 18 so that the upper portion of the dial 40 is illuminated by light from the distributed light source 20 which is transmitted through the translucent mask 18. Preferably, the dial 40 is transparent and the television station channel numbers 41 are hot stamped or otherwise suitably inscribed on the front surface of the dial 40, the numerals 41 being opaque so that they stand out clearly against the soft, luminous background provided by light from the translucent mask 18. With this arrangement the particular television station to which the receiver is tuned is clearly visible to an observer many feet distant from the receiver without requiring a conventional dial light assembly and power circuit arrangement therefor and while providing dial illumination which harmonizes and blends with the surround lighting provided for the image screen of the receiver so that eye discomfort to the observer is minimized.

In order to position the dial 40 with the upper portion thereof above the knob rail 14 while employing a relatively narrow knob rail structure it is necessary to mount the dial 40 on an axis which is offset from the axis of the tuning shafts 27 and 28. Furthermore, it is desirable to provide a mounting arrangement wherein the dial 40 may be driven from the station selector knob 25 and yet may be readily disconnected from the knob 25 to permit alignment of the dial to a predetermined station setting. To accomplish these results, a first metal bracket 45 is mounted by means of the screws 46 on the recessed surface 47 of the insert 35, the bracket 45 being provided with a pair of rearwardly turned end walls 48 and 49 which are employed to support a second bracket 50, the station indicating dial 40 being positioned between the brackets 45 and 50. Suitable projections 51 are provided on the bracket 45 and projections 52 on the bracket 50 to minimize friction between the dial 40 and the brackets 45 and 50 and prevent binding between these members as the dial 40 is rotated. The bracket 50 is provided with a plurality of rearwardly extending flanges 53 which are adapted to support the hub portion 55 of the dial 40, the hub portion 55 being annular in shape and provided with internal ring gear teeth 56 which are adapted to mesh with the external spur gear teeth 57 which are formed integrally with the shaft portion 58 of the outer knob 25.

The bracket 50 is also provided with the retaining arm portions 60 and 61 which serve loosely to retain the hub portion 55 of the dial 40 in the pocket formed by the flanges 53. The end portion 48 of the bracket 45 is provided with notches 65 and 66, the notch 65 being adapted to receive a notch 67 in the end portion 68 of the bracket 50 and the notch 66 receiving the flared bottom portion 69 of the bracket 50 so that the bracket 50 is pivotally secured to the end wall 48 in spaced relation to the bracket 45. The bracket 50 is provided with a second extending arm 70 which terminates in a rearwardly turned end portion 71, the arm 70 being normally positioned under a downwardly extending arm 72 on the end wall 49 of the bracket 45 and being biased upwardly by means of the spring 73, the lower end of the spring 73 being positioned in a notch 74 provided in the end portion 71 and the upper end of the spring 73 being secured by any suitable means to the upper edge of the end wall 49. The bracket 50 is thus urged upwardly so that the flanges 53 engage the hub portion 55 of the dial 40 and urge the ring gear teeth 56 into engagement with the spur gear teeth 57 on the station selector knob 25. A gear reduction is provided between the station selector knob 25 and the indicator dial 40, it being understood that a suitable gearing arrangement is provided in the tuner portion of the receiver to function with the above described selector knob arrangement. In order to secure the knob 25, which is preferably made of a suitable plastic material, to the station selector shaft 27, a tiltable locking member 90 is provided which has a serrated opening 91 therein adapted to receive the shaft 27, the member 90 being provided with a tab portion 92 which extends through an aperture 93 in the side wall of the selector knob 25. A locking screw 94 is threaded into a nut 95 embedded in the selector knob 25 and extends through a slot in the other end of the locking member 90 so as to wedge the same about the shaft 27 and lock the knob 25 securely thereto.

When it is desired to adjust the position of the indicator dial 40 with respect to the station selector shaft 27, as for example when the receiver is initially aligned at the factory, the bracket 50 is pivoted downwardly against the force of the biasing spring 73 so that the ring gear teeth 56 are moved out of engagement with the spur gear teeth 57 at which time the tuning dial 40 may be rotated to the desired indicating position and the bracket 50 released so that the gear teeth 56 and 57 are again placed in engagement. It will also be noted that a very simple mechanical arrangement is provided for mounting the indicator dial 40 on an axis which is offset from the axis of the station selector knob 25 while permitting the dial 40 to be adjusted to a desired factory setting in the manner described above.

While the present invention has been illustrated in connection with an embodiment wherein the dial 40 is positioned between the window 37 and the light diffusing mask 18, it will be understood that the dial 40 may be readily positioned in other locations in which a desired portion of the dial is illuminated by light from the distributed light source 20.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. In a television receiver, a cabinet including a knob rail extending transversely across the front thereof, means including said knob rail for defining a frame positioned adjacent to and substantially surrounding the image screen of the receiver but spaced therefrom by a wide margin, a light-diffusing translucent mask positioned to provide a wide margin surrounding said image screen and extending from the edges thereof to said frame, a distributed light source positioned behind said mask to illuminate said mask uniformly and provide surround lighting of said image screen, a station selector knob assembly mounted on said knob rail and including a spur gear element, a station indicating dial having an annular hub portion defining a ring gear element, and resilient mounting means for supporting said dial with said ring gear in engagement with said spur gear and with the upper portion of said dial extending above said knob rail so that said dial is illuminated by said distributed light source during actual use and during adjustment of the position of the dial relative to said station selector knob assembly and a protective window spaced from and in front of said dial and image screen whereby an outer portion of said dial is illuminated and viewable through said protective window.

2. In a television receiver, a cabinet including a knob rail extending transversely across the front thereof, means including said knob rail for defining a frame positioned adjacent to and substantially surrounding the image screen of the receiver but spaced therefrom by a wide margin, a light-diffusing translucent mask positioned to provide a wide margin surrounding said image screen and extending from the edges thereof to said frame, a distributed light source positioned behind said mask to illuminate said mask uniformly and provide surround lighting of said image screen, a station selector knob assembly mounted on said knob rail and including a spur gear element, a station indicating dial having an annular hub portion defining a ring gear element, means including a pair of brackets positioned on opposite sides of said dial for mounting said dial, one of said brackets being secured to said knob rail and the other of said brackets having an aperture for receiving said hub portion, and means resiliently biasing said other bracket so that said ring gear is urged into engagement with said spur gear and the upper portion of said dial projects beyond said knob rail and is illuminated by said distributed light, said upper portion of the dial projecting beyond said knob rail and illuminated by said distributed light source to facilitate accurate relative positioning of said dial and said knob assembly even when said ring gear is disengaged from said spur gear and a protective window spaced from and in front of said dial and image screen whereby an outer portion of said dial is illuminated and viewable through said protective window.

References Cited in the file of this patent

UNITED STATES PATENTS

| | | |
|---|---|---|
| 1,461,493 | Moore | July 10, 1923 |
| 1,674,738 | Pinkam | June 26, 1928 |

| | | |
|---|---|---|
| 2,465,354 | Clark | Mar. 29, 1949 |
| 2,601,841 | Zindel | July 1, 1952 |
| 2,606,239 | Beste | Aug. 5, 1952 |
| 2,615,420 | Felt | Oct. 28, 1952 |
| 2,669,708 | Du Mont | Feb. 16, 1954 |
| 2,780,200 | Winters | Feb. 5, 1957 |

FOREIGN PATENTS

| | | |
|---|---|---|
| 316,655 | Germany | Nov. 21, 1919 |
| 366,576 | Great Britain | Feb. 8, 1932 |